(12) United States Patent
Pydin

(10) Patent No.: US 10,436,293 B2
(45) Date of Patent: Oct. 8, 2019

(54) CONTINUOUSLY VARIABLE TRANSMISSION

(71) Applicant: HONDA MOTOR CO., LTD., Tokyo (JP)

(72) Inventor: Andrii Pydin, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 262 days.

(21) Appl. No.: 15/506,076

(22) PCT Filed: May 13, 2015

(86) PCT No.: PCT/JP2015/063744
§ 371 (c)(1),
(2) Date: Feb. 23, 2017

(87) PCT Pub. No.: WO2016/035385
PCT Pub. Date: Mar. 10, 2016

(65) Prior Publication Data
US 2017/0254394 A1 Sep. 7, 2017

(30) Foreign Application Priority Data
Sep. 5, 2014 (JP) .................................. 2014-181402

(51) Int. Cl.
*F16H 9/18* (2006.01)
*F16H 9/12* (2006.01)
*F16H 55/56* (2006.01)

(52) U.S. Cl.
CPC .................. *F16H 9/18* (2013.01); *F16H 9/12* (2013.01); *F16H 55/56* (2013.01)

(58) Field of Classification Search
CPC ................ F16H 9/12; F16H 55/56; F16H 9/18
(Continued)

(56) References Cited

U.S. PATENT DOCUMENTS

| 4,634,405 | A | * | 1/1987 | Quick | F16H 55/563 |
| | | | | | 29/892.1 |
| 6,017,285 | A | * | 1/2000 | Yasuhara | F16H 55/56 |
| | | | | | 474/12 |

(Continued)

FOREIGN PATENT DOCUMENTS

| JP | 68-2448 A | 1/1983 |
| JP | 63-89458 U | 6/1988 |

(Continued)

OTHER PUBLICATIONS

Office Action dated Aug. 15, 2017, issued in counterpart Japanese Application No. 2016-546341, with machine translation. (8 pages).

(Continued)

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

A continuously variable transmission includes an input pulley (1) in which a pair of pulley halves (4) with pulley faces (4a) form a V-groove (6), an input shaft (2) which journals the input pulley (1), and an endless transmission member (5) wound on the input pulley (1). One of the pulley halves (4) of the input pulley (1) has a piston part (16) relatively rotatable with respect to the input shaft (2) and a pulley half disc (13) slidable on the surface of the piston part (16) through the intermediary of a friction reducing part (11) between the piston part (16) and the endless transmission member (5). The pulley half disc (13) is splined to and integrally rotated with the input shaft (2).

6 Claims, 4 Drawing Sheets

(58) Field of Classification Search
USPC .......................................................... 474/28
See application file for complete search history.

(56) References Cited

U.S. PATENT DOCUMENTS

| | | | | |
|---|---|---|---|---|
| 6,123,634 A | * | 9/2000 | Faust | ...................... F16H 55/56 474/18 |
| 6,648,781 B1 | * | 11/2003 | Fischer | ................... F16H 55/56 474/201 |

FOREIGN PATENT DOCUMENTS

| | | | |
|---|---|---|---|
| JP | 11-13846 A | 1/1999 | |
| JP | 2004-156686 A | 6/2004 | |
| JP | 2005-53344 A | 3/2005 | |
| JP | 2013-160373 A | 8/2013 | |

OTHER PUBLICATIONS

International Search Report dated Aug. 4, 2015, issued in counterpart International Application No. PCT/JP2015/063744 (2 pages).

\* cited by examiner

CONTINUOUSLY VARIABLE TRANSMISSION

TECHNICAL FIELD

The present invention relates to a continuously variable transmission provided with pulleys.

BACKGROUND ART

Hitherto, there has been known a continuously variable transmission in which an endless transmission member composed of a band-like belt is wound between an input pulley and an output pulley, and the gear ratio is changed by the widths of the grooves of the input pulley and the output pulley (refer to, for example, Japanese Utility Model Application Publication No. S63-89458).

According to the continuously variable transmission described in Japanese Utility Model Application Publication No. S63-89458, a conical disc is disposed to prevent a collision noise between the endless transmission member and the pulleys.

CITATION LIST

Patent Literature

Patent Literature 1: Japanese Utility Model Application Publication No. S63-89458

SUMMARY OF INVENTION

Technical Problem

Every day, research and development efforts have been made to reduce a power loss in the foregoing type of continuously variable transmission.

An object of the present invention is to provide a continuously variable transmission capable of reducing power loss than the conventional one.

Solution to Problem

[1] To this end, the present invention provides a continuously variable transmission including:

an input pulley and an output pulley, each having a pair of pulley halves which have pulley faces and which form a V-groove;

a rotating shaft which journals the input pulley or the output pulley; and an endless transmission member wound between the input pulley and the output pulley, wherein a gear ratio is changed by changing a width of the V-groove of the input pulley or the output pulley and a driving force transmitted to the input pulley is transmitted to the output pulley through the endless transmission member, each of the input pulley and the output pulley is composed of a pair of pulley halves, the pulley halves of at least either the input pulley or the output pulley each has a first half element that is relatively rotatable with respect to the rotating shaft and a second half element that is slidable on a surface of the first half element between the first half element and the endless transmission member, and the second half element is configured to rotate integrally with the rotating shaft serving as a center of rotation.

According to the present invention, only the second half element rotates, and the first half elements do not rotate integrally with the rotating shaft. With this arrangement, the number of rotating components that rotate integrally with the rotating shaft can be decreased, so that the substantial mass of the pulleys can be reduced when rotating the pulleys, thus making it possible to reduce the power loss.

[2] Further, according to the present invention, the pulley halves of the input pulley and the pulley halves of the output pulley are moving halves, which are movable in at least an axial direction, and the moving halves can be comprised of a first half element which is movable in the axial direction with respect to the rotating shaft and the rotation of which is blocked, and a second half element which is movable in the axial direction with respect to the rotating shaft and which rotates integrally with the rotating shaft.

Here, conventionally, a configuration whereby the width of the V-groove of a pulley can be changed by an oil pressure requires that the rigidity of an oil pressure chamber be increased so as to withstand a centrifugal oil pressure, and also requires a centrifugal canceller, which cancels the centrifugal force of the oil in the oil pressure chamber, so that a relatively large power will be necessary.

In the present invention, the configuration described above prevents the first half element from being influenced by the rotations (the centrifugal forces) of the rotating shaft and the pulley half. Hence, when adjusting the width of the V-groove to change the gear ratio by an oil pressure, a centrifugal oil pressure, which occurs in a conventional transmission, will not occur according to the present invention. This enables the first half element to be moved in the axial direction by less power (oil pressure), thus permitting a further reduction of the power loss.

[3] Further, in the present invention, a friction reducing part having a plurality of rolling elements, which are arranged in a circumferential direction with intervals provided thereamong, can be provided between the first half element and the second half element. According to this configuration, the friction reducing part reduces the friction between the first half element and the second half element so as to allow the second half element to rotate more easily, thus permitting a further reduction of power loss. In addition, the plurality of the rolling elements arranged in the circumferential direction with intervals provided thereamong in the friction reducing part enable the second half element to stably rotate.

DESCRIPTION OF EMBODIMENTS

An embodiment of the continuously variable transmission in accordance with the present invention will be described with reference to the accompanying drawings. The continuously variable transmission of the present embodiment includes an input pulley, an output pulley, and a band-like endless transmission member composed of a belt (or chain) wound between the two pulleys. In the present embodiment, the input pulley and the output pulley have the same configuration, so that the input pulley will be described in detail and the detailed description of the output pulley will be omitted.

Figure 1:
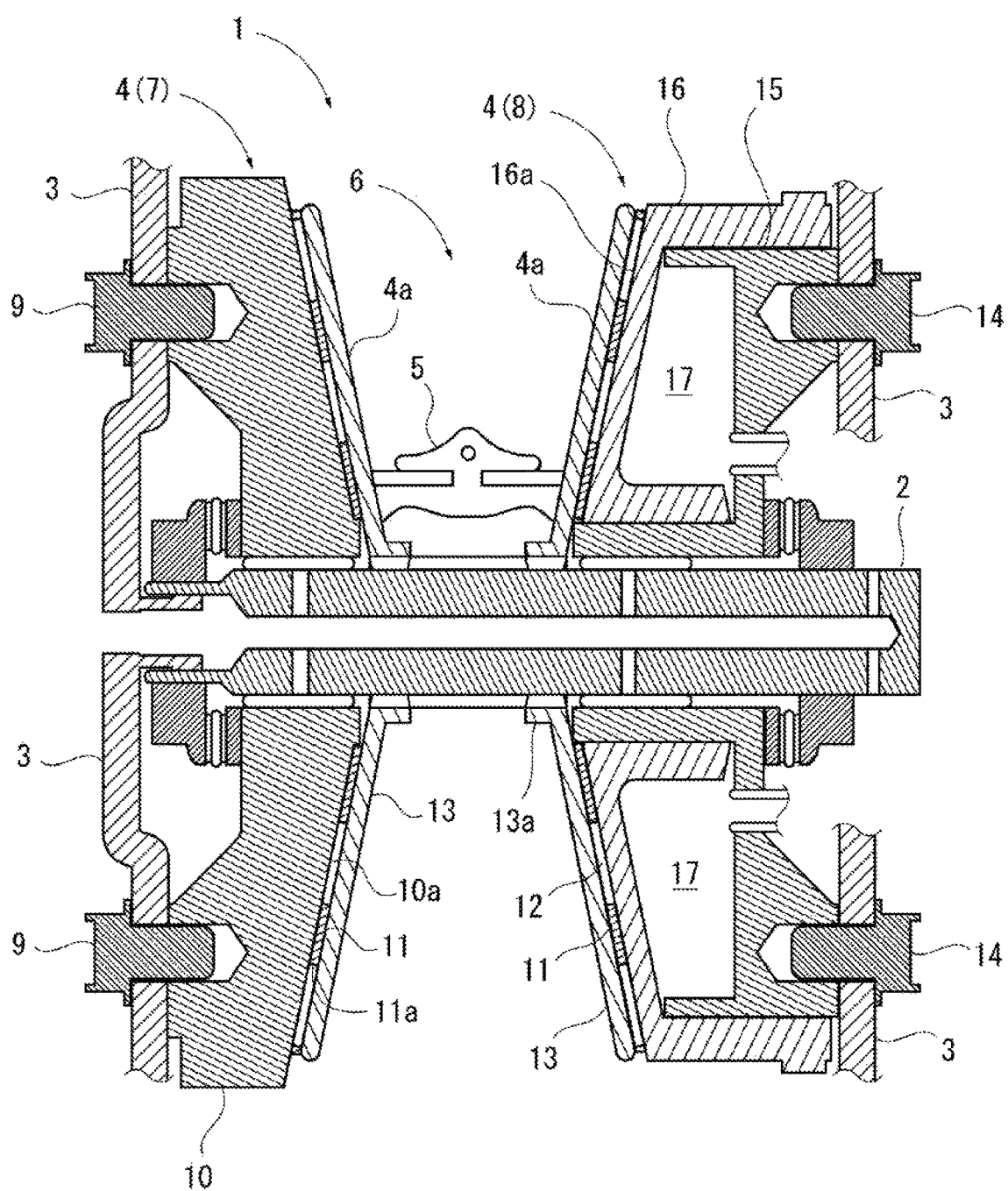
FIG. 1 is a sectional view illustrating an embodiment of a continuously variable transmission in accordance with the present invention.

As illustrated in FIG. 1, an input pulley 1 is provided on an input shaft 2 as the rotating shaft to which a driving force from an internal-combustion engine or a motor is transmitted. The input shaft 2 is rotatably journaled on a transmission case 3 that houses the input pulley 1. The input pulley 1 is composed of a pair of pulley halves 4.

The pulley halves 4 have pulley faces 4a that form a V-groove 6 in which an endless transmission member 5 is wound.

One pulley half 4 (on the left in FIG. 1) is a fixed half 7 that is immovably fixed in an axial direction. The other pulley half 4 (on the right in FIG. 1) is a moving half 8 that is movable in the axial direction.

The fixed half 7 has a fixed part 10 that is secured to the transmission case 3 by bolts 9. The fixed part 10 corresponds to a first half element in the present invention. On the fixed part 10, a conical tapered surface 10a which has the same shape as the pulley faces 4a forming the V-groove 6 is formed.

Figure 2:
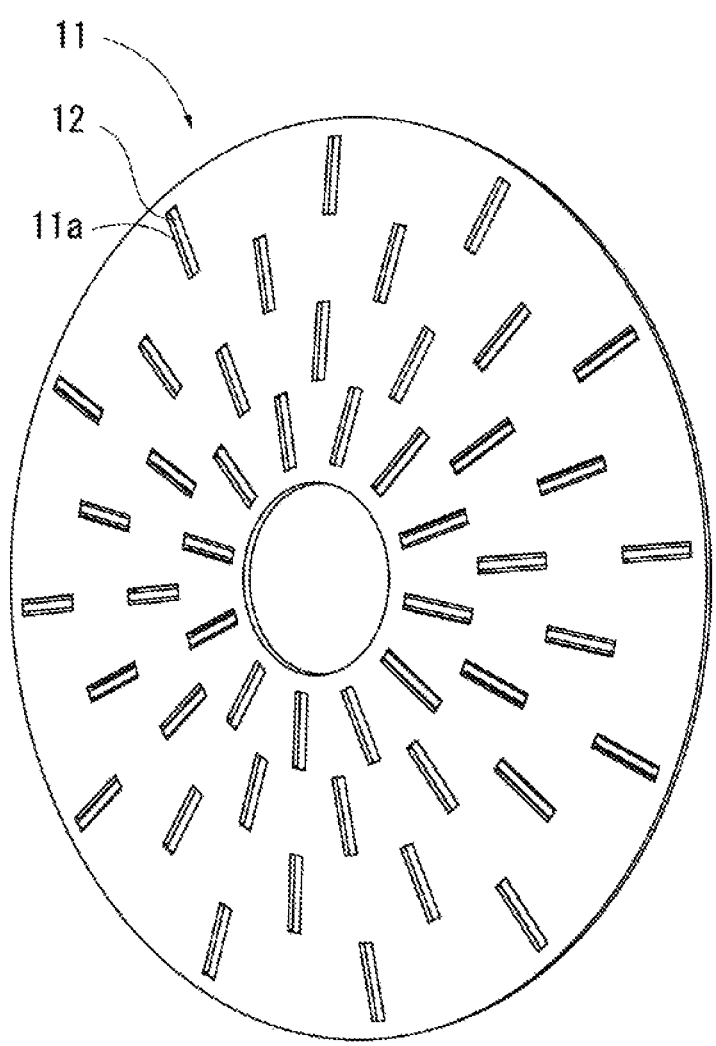
FIG. 2 is a perspective view illustrating a friction reducing part of the continuously variable transmission of a present embodiment.

Further, a conical-plate-shaped friction reducing part 11 having the same shape as the tapered surface 10a is disposed on the tapered surface 10a of the fixed part 10. As illustrated in FIG. 2, the friction reducing part 11 has rectangular through holes 11a, which are provided at a plurality of locations and which extend in a radial direction. Each of the through holes 11a houses a columnar roller 12.

A conical-plate-shaped pulley half disc 13 having the same shape as the friction reducing part 11 is disposed on the surface of the friction reducing part 11, which surface being the opposite side from the fixed part 10. The pulley half disc 13 slides on the tapered surface 10a (the face) of the fixed part 10 through the intermediary of the friction reducing part 11. The pulley half disc 13 corresponds to the second half element in the present invention. The pulley half disc 13 has the pulley face 4a, which comes in contact with the endless transmission member 5 and constitutes the V-groove 6.

Figure 3:
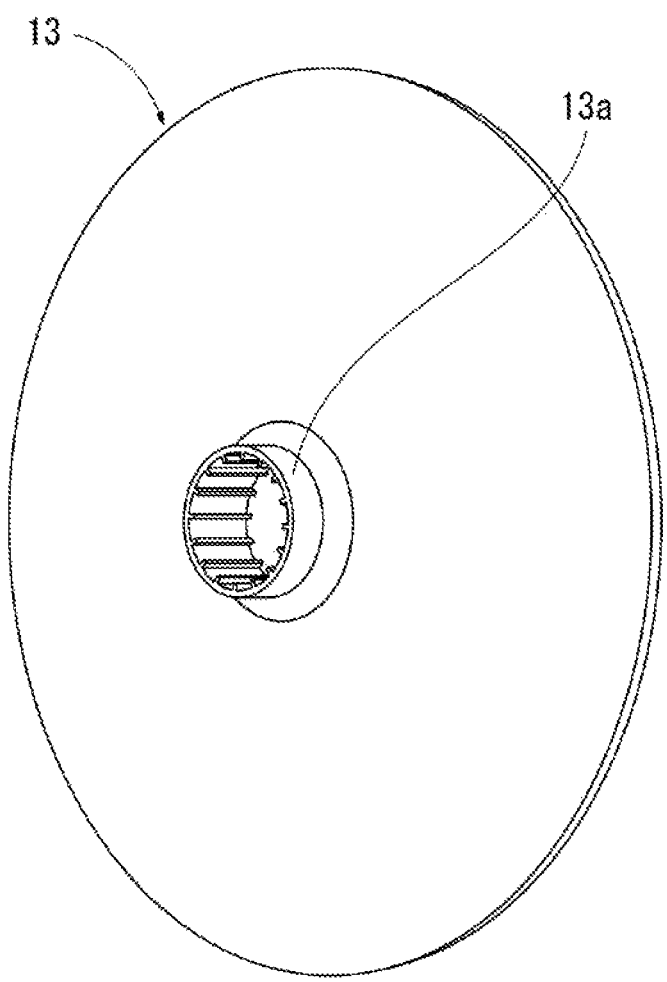
FIG. 3 is a perspective view illustrating a second pulley of the continuously variable transmission of the present embodiment.

As illustrated in FIG. 3, a cylindrical portion 13a splined to the input shaft 2 is provided in a radial inner end portion of the pulley half disc 13. Thus, the pulley half disc 13 rotates integrally with the input shaft 2, the input shaft 2 being the center of rotation.

The moving half 8 has a fixed part 15 which is fixed to the transmission case 3 by bolts 14. A piston part 16, which is movable in the axial direction, is disposed on the fixed part 15. The piston part 16 is attached unrotatably about the input shaft 2 with respect to the fixed part 15. The piston part 16 also corresponds to the first half element in the present invention. An oil pressure chamber 17 is defined between the fixed part 15 and the piston part 16. A tapered surface 16a opposing the tapered surface 10a of the fixed half 7 is formed on the piston part 16.

Disposed on the tapered surface 16a of the piston part 16 is a friction reducing part 11 having the same shape as the conical-plate-shaped friction reducing part 11 disposed on the tapered surface 10a of the fixed part 10. Further, a pulley half disc 13 identical to the pulley half disc 13 of the fixed half 7 is disposed on the surface of the friction reducing part 11 disposed on the piston part 16, the surface being on the opposite side from the piston part 16. The pulley half disc 13 slides on the tapered surface 16a (the face) of the piston part 16 through the intermediary of the friction reducing part 11. The pulley half disc 13 also corresponds to the second half element in the present invention. The cylindrical portion 13a splined to the input shaft 2 is also provided in the radial inner end portion of the pulley half disc 13.

Figure 4:
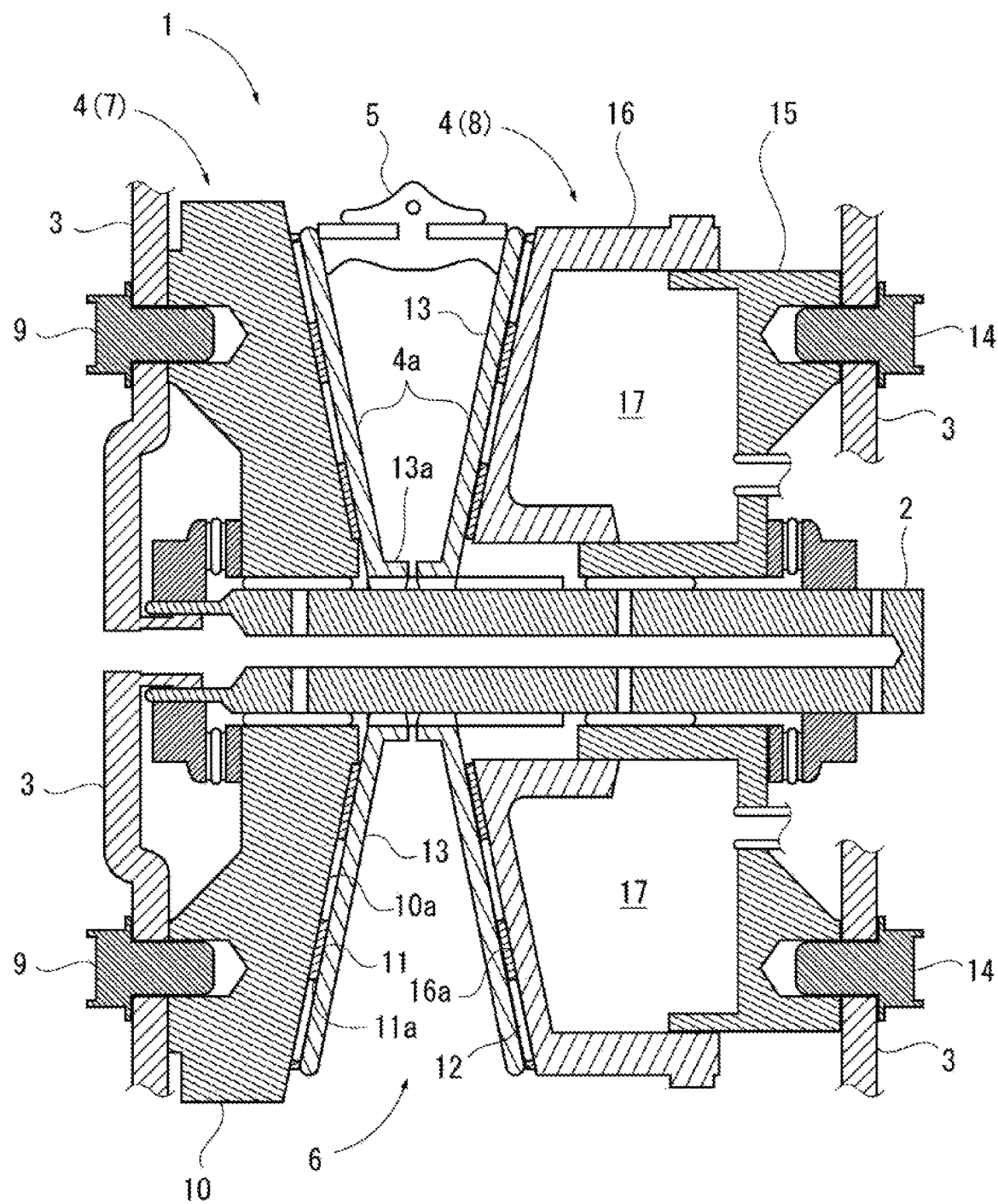
FIG. 4 is a sectional view illustrating a state in which the width of a V-groove of the continuously variable transmission of the present embodiment has been narrowed and the winding diameter of an endless transmission member has been increased.

As illustrated in FIG. 4, when oil is supplied to the oil pressure chamber 17, the piston part 16 moves to one side (the left side in FIG. 1 or FIG. 4) in the axial direction, causing the width of the V-groove 6 of the input pulley 1 to be decreased. This increases the winding radius of the endless transmission member 5 wound on the input pulley 1.

Conversely, when the oil is drained from the oil pressure chamber 17, the piston part 16 moves to the other side (the right side in FIG. 1 or FIG. 4) in the axial direction, causing the width of the V-groove 6 of the input pulley 1 to be increased, as illustrated in FIG. 1. This decreases the winding radius of the endless transmission member 5 wound on the input pulley 1.

The continuously variable transmission according to the present embodiment changes the gear ratio by adjusting the winding radius of the endless transmission member 5 as described above.

In the continuously variable transmission according to the present embodiment, the fixed part 10 as the first half element is fixed to the transmission case 3, and the piston part 16 also as the first half element is unrotatably provided on the transmission case 3 through the intermediary of the fixed part 15. In the continuously variable transmission according to the present embodiment, therefore, only the pulley half disc 13 as the second half element rotates, whereas the fixed part 10 and the piston part 16 as the first half elements do not rotate. Hence, there are fewer rotating components that rotate integrally with the input shaft 2 as a rotating shaft, so that the continuously variable transmission according to the present embodiment permits a reduction of the mass of the pulleys, thus allowing the power loss to be reduced.

Further, according to a conventional continuously variable transmission, the configuration in which the width of the V-groove of a pulley is changed by an oil pressure requires that the rigidity of an oil pressure chamber be increased so as to withstand a centrifugal oil pressure, and also requires a centrifugal canceller, which cancels the centrifugal force of the oil in the oil pressure chamber, so that a relatively large power will be necessary.

In contrast to the conventional continuously variable transmission, in the continuously variable transmission according to the present embodiment, the moving half 8 of the input pulley 1 is composed of the piston part 16 as the first half element, which is provided on the transmission case 3 through the intermediary of the fixed part 15 such that the rotation is prevented, and the pulley half disc 13 as the second half element, which is movable in the axial direction with respect to the input shaft 2 as the rotating shaft and which rotates integrally with the input shaft 2.

This configuration prevents the piston part 16 as the first half element, which changes the width of the V-groove 6, from being influenced by the rotations (the centrifugal forces) of the input shaft 2 and the pulley half disc 13. Unlike the conventional transmission, therefore, the centrifugal oil pressure does not occur when the width of the V-groove 6 is adjusted to change the gear ratio of the continuously variable transmission, so that the piston part 16 can be moved in the axial direction by less power (oil pressure), thus making it possible to further reduce the power loss.

Further, in the continuously variable transmission according to the present embodiment, the friction reducing part 11, which has the plurality of rollers 12 as the rolling elements arranged with intervals provided thereamong, in the circumferential direction, is provided between the fixed part 10 as the first half element and the pulley half disc 13 as the second half element, and between the piston part 16 as the first half element and the pulley half disc 13 as the second half element.

With this arrangement, the friction reducing parts 11 reduce the friction between the fixed part 10 or the piston part 16 as the first half element and the pulley half disc 13 as the second half element. This enables the pulley half disc 13 to smoothly rotate, thus permitting a further reduction in the power loss. Further, each of the friction reducing parts 11 has the plurality of the rollers 12 as the rolling elements arranged with intervals provided thereamong in the circumferential direction, thus enabling the pulley half disc 13 to stably rotate.

In the present embodiment, the description has been given of the case where the output pulley has the same configuration as that of the input pulley 1; however, the moving half of the output pulley according to the present invention is not limited thereto. A different configuration may be adopted for the moving half insofar as the width of the V-groove decreases as the width of the V-groove 6 of the input pulley 1 increases, while the width of the V-groove increases as the width of the V-groove 6 of the input pulley 1 decreases. For example, therefore, the moving half of the output pulley may be configured to be biased to one side by a spring.

Further, in the present embodiment, the description has been given of the case where the first half element is unrotatably fixed to the transmission case 3; however, the first half element in the present invention is not limited thereto. A first half element that is relatively rotatable with respect to the rotating shaft may be used although the effect for decreasing the power loss is reduced. This obviates the need for rotating the first half element by the rotating shaft, such as the input shaft or the output shaft, and can provide the effect for reducing the power loss more than in the conventional transmission.

Further, in the present embodiment, the description has been given of the case where the moving half is moved by the oil pressure; however, the power source of the moving half in the present invention is not limited thereto. For example, an electric actuator may be used to move the moving half thereby to change or adjust the width of the V-groove.

DESCRIPTION OF REFERENCE NUMERALS

1 Input pulley
2 Input shaft (Rotating Shaft)
3 Transmission case
4 Pulley half
4a Pulley face
5 Endless transmission member
6 V-groove
7 Fixed half
8 Moving half
9 Bolt
10 Fixed part (First half element)
10a Tapered surface
11 Friction reducing part
11a Through hole
12 Roller
13 Pulley half disc (Second half element)
13a Cylindrical portion
14 Bolt
15 Fixed part
16 Piston part (First half element)
16a Tapered surface
17 Oil pressure chamber

The invention claimed is:

1. A continuously variable transmission comprising:
an input pulley and an output pulley, each having a pair of pulley halves which have pulley faces and which form a V-groove;
a rotating shaft which journals the input pulley or the output pulley; and
an endless transmission member wound between the input pulley and the output pulley,
wherein a gear ratio is changed by changing a width of the V-groove of the input pulley or the output pulley, and a driving force transmitted to the input pulley is transmitted to the output pulley through the endless transmission member,
each of the input pulley and the output pulley is composed of a pair of pulley halves,
the pulley halves of at least either the input pulley or the output pulley each has a first half element that is rotatable with respect to the rotating shaft and a second half element that is slidable on a surface of the first half element between the first half element and the endless transmission member,
the second half element is configured to rotate integrally with the rotating shaft serving as a center of rotation,
a size of the first half element in a radial direction is set to be equal to or more than a size of the second half element in the radial direction,
the second half element includes a pulley face which forms a part of the V-groove, and
the first half element includes a tapered surface having a conical shape which is a same shape as the pulley face.

2. The continuously variable transmission according to claim 1,
wherein the pulley halves of the input pulley and the pulley halves of the output pulley are moving halves, which are movable in at least an axial direction, and
the moving halves include:
the first half element which is movable in the axial direction with respect to the rotating shaft and the rotation of which is blocked in the continuously variable transmission, and
the second half element which is movable in the axial direction with respect to the rotating shaft and which rotates integrally with the rotating shaft.

3. The continuously variable transmission according to claim 2,
wherein a conical-plate-shaped friction reducing part having a plurality of rolling elements, which are arranged in a circumferential direction with intervals provided thereamong, is provided between the tapered surface of the first half element and the second half element.

4. The continuously variable transmission according to claim 2,
wherein the rotation of the first half element is blocked in the continuously variable transmission from rotating with the rotating shaft.

5. The continuously variable transmission according to claim 1, wherein a conical-plate-shaped friction reducing part having a plurality of rolling elements, which are arranged in a circumferential direction with intervals provided thereamong, is provided between the tapered surface of the first half element and the second half element.

6. The continuously variable transmission according to claim 1,
wherein the pulley halves of the input pulley and the pulley halves of the output pulley are fixed halves, which are fixed unable to move in an axial direction, and the fixed halves include:
the first half element the rotation of which is blocked in the continuously variable transmission, and
the second half element which rotates integrally with the rotating shaft.

* * * * *